United States Patent
Kuroda

(10) Patent No.: US 8,927,128 B2
(45) Date of Patent: Jan. 6, 2015

(54) BATTERY UNIT

(71) Applicant: Honda Motor Co., Ltd., Tokyo (JP)

(72) Inventor: Kazunori Kuroda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 129 days.

(21) Appl. No.: 13/792,507

(22) Filed: Mar. 11, 2013

(65) Prior Publication Data

US 2013/0244068 A1 Sep. 19, 2013

(30) Foreign Application Priority Data

Mar. 16, 2012 (JP) .................................. 2012-060229

(51) Int. Cl.
| | |
|---|---|
| *H01M 2/12* | (2006.01) |
| *H01M 2/10* | (2006.01) |
| *B60R 16/04* | (2006.01) |
| H01M 10/625 | (2014.01) |
| H01M 10/6566 | (2014.01) |

(52) U.S. Cl.
CPC ............ *H01M 2/1083* (2013.01); *B60R 16/04* (2013.01); *H01M 2/1077* (2013.01); *H01M 10/5016* (2013.01); *H01M 10/5073* (2013.01)
USPC ............................................. 429/82; 429/99

(58) Field of Classification Search
CPC . H01M 2/043; H01M 2/1077; H01M 2/1083; H01M 10/5016; H01M 10/5073
USPC ..................................................... 429/82, 99
See application file for complete search history.

(56) References Cited

U.S. PATENT DOCUMENTS

| | | | | |
|---|---|---|---|---|
| 6,188,574 | B1* | 2/2001 | Anazawa ....................... | 361/695 |
| 8,642,206 | B2* | 2/2014 | Kim et al. ..................... | 429/159 |
| 2010/0112424 | A1* | 5/2010 | Hayashi .......................... | 429/99 |
| 2011/0189521 | A1* | 8/2011 | Lee et al. ....................... | 429/120 |
| 2012/0028099 | A1* | 2/2012 | Aoki .............................. | 429/120 |
| 2012/0114984 | A1* | 5/2012 | Kim et al. ....................... | 429/53 |
| 2012/0114985 | A1* | 5/2012 | Kim et al. ....................... | 429/53 |
| 2012/0114992 | A1* | 5/2012 | Kim et al. ....................... | 429/82 |
| 2012/0115016 | A1* | 5/2012 | Kim .............................. | 429/159 |
| 2013/0071713 | A1* | 3/2013 | Kim .............................. | 429/99 |

FOREIGN PATENT DOCUMENTS

| | | |
|---|---|---|
| DE | 19837449 C1 | 1/2000 |
| DE | 102010039323 A1 | 2/2012 |
| JP | 2004-47426 | 2/2004 |

* cited by examiner

*Primary Examiner* — Stewart Fraser
(74) *Attorney, Agent, or Firm* — Rankin, Hill & Clark LLP

(57) ABSTRACT

A battery unit that prevents an expansion of a battery cell, and that can prevent an increase in size of the battery unit or an increase in the number of components. The battery unit includes a box-like battery case that accommodates therein a battery module having a generally rectangular solid shape and including plural sheet-like battery cells stacked flat in a vertical direction of a vehicle body. The battery unit includes: a bottomed box-like casing body that forms a part of the battery case and into which the battery module is accommodated from above the vehicle body; and a fixing plate that abuts on a top surface of the battery module. The battery module is fixed to the casing body with pressure being applied to the battery module from above the vehicle body, by fastening the fixing plate to the casing body.

8 Claims, 11 Drawing Sheets

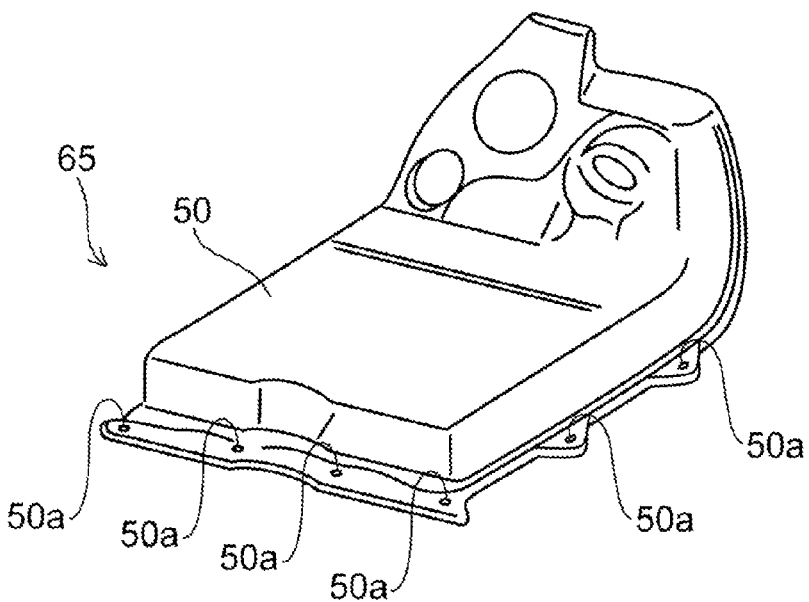
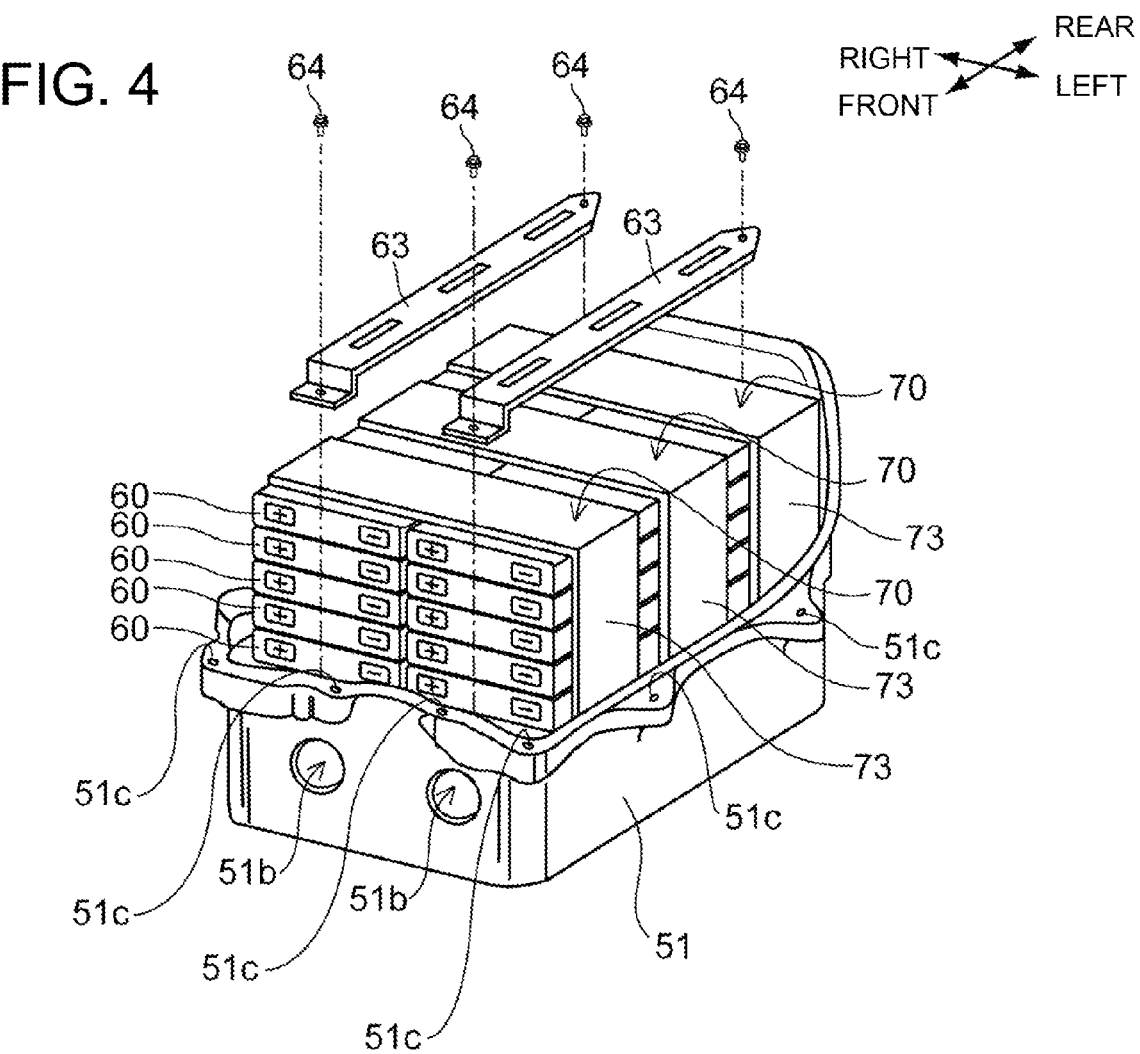
FIG. 4

BATTERY UNIT

BACKGROUND OF THE INVENTION

1. Field of the Invention

The present invention relates to a battery unit, and more particularly to a battery unit applied to an electric vehicle that travels by driving a motor with power of a battery.

2. Description of Related Art

An assembled battery formed by collecting plural battery cells, i.e., a so-called battery module, is used as a battery for supplying power to a motor of an electric vehicle.

JP Patent No. 4242665 describes a battery unit that includes a battery module having a generally rectangular solid shape and formed by stacking tabular battery cells with a certain thickness, in a longitudinal direction of a vehicle body, wherein a size in a vertical direction of the battery module is smaller than sizes of the battery module in the longitudinal direction and a vehicle width direction. The battery unit is configured so that cooling air is passed through, in the vehicle width direction of the battery module, through a gap between the battery cells to cool the battery module.

The technology described in JP Patent No. 4242665 provides the structure in which both end faces of the battery module are connected by a plate-like member extending in a stacking direction of the battery cell in order to maintain a positional relationship between the battery cells. However, JP Patent No. 4242665 does not describe a countermeasure for the situation in which each battery cell expands due to the temperature rise or secular change. When the structure of preventing the expansion of the battery module is applied, there arises a problem of an increase in size of the battery unit or an increase in the number of components.

SUMMARY OF THE INVENTION

An object of the present invention is to address the problem of the related art, and to provide a battery unit that can prevent an increase in size of the battery unit and an increase in the number of components while applying a structure that prevents an expansion of a battery cell.

In order to attain the foregoing object, according to a first aspect of the present invention, there is provided a battery unit including a box-like battery case that accommodates therein a battery module having a generally rectangular solid shape and including plural sheet-like battery cells stacked flat in a vertical direction of a vehicle body, the battery case being mounted to the vehicle body. The battery unit includes a bottomed box-like casing body and a fixing plate. The casing body forms a part of the battery case into which the battery module is accommodated from above the vehicle body. The fixing plate abuts on a top surface of the battery module. The battery module is configured to be fixed to the casing body, with pressure being applied to the battery module from above the vehicle body, by fastening the fixing plate to the casing body. Plural battery modules are arranged and the fixing plate is a long member spanning across the plural battery modules. A fastening portion for the fixing plate is provided near an opening of the casing body.

Therefore, this configuration can impart to a single fixing plate a function of fixing the battery module to the casing body and a function of preventing the expansion of the battery cell caused by secular change and heat generation. Accordingly, a tightening structure for preventing the expansion of the battery cell can be simplified to reduce the number of components, whereby the battery unit can be made compact.

In addition, plural battery modules can be fixed to the casing body with a single fixing plate. Thus, the number of fastening portions and components can be reduced to make the battery unit compact.

In addition, the space between the battery module and the casing body can be easily decreased, for example, compared to a structure in which the fastening portion of the fixing plate is provided in the vicinity of the bottom of the casing body, whereby the battery unit can be made compact. Further, since the length of the fixing plate can be reduced, the possibility of deformation of the fixing plate caused by the expansion of the battery can be reduced.

In accordance with another aspect of the invention, the battery module includes a battery cell accommodating case accommodating the battery cells, and a partition plate sandwiched between the battery cells is provided on an inner wall of the battery cell accommodating case. Therefore, the space between the battery cells in the stacking direction can easily be regulated.

In accordance with another aspect of the invention, the partition plate has a shape that abuts on at least a part of one surface of each battery cell. Accordingly, the space between the battery cells can be regulated by the portion where the partition plate abuts on the battery cells, and a predetermined gap can be formed between the battery cells where the partition plate does not abut on the battery cells. Thus, a cooling air passage can be secured between the battery cells.

According to another aspect of the invention, a through-hole for introducing outside air is formed in one wall face of the casing body at the front of the vehicle body, and the battery unit includes a first intermediate member that closes a gap between the battery modules; and a second intermediate member closes a gap between an inner wall of the casing body and a side face of the battery module. The second intermediate member is formed to guide the outside air, introduced from the through-hole, toward one of left side and right side of the battery module. Therefore, the outside air introduced to one of left side and right side of the battery module can efficiently be guided to the gap between the battery cells, not to the gap between the battery modules.

According to another aspect of the invention, the battery unit further includes a third intermediate member provided on a surface of the battery module at one of left side and right side in order to prevent outside air, introduced to one of the left side and right side of the battery module by the second intermediate member, from escaping toward the top surface and a rear surface of the battery module. Therefore, the outside air introduced to one of left side and right side of the battery module is surely led to flow between the battery cells.

According to another aspect of the invention, the battery module includes a battery cell accommodating case accommodating the battery cells, a partition plate sandwiched between the battery cells is provided on an inner wall of the battery cell accommodating case, and the partition plate is formed to have projecting portions alternately projecting toward the inside of the battery cell accommodating case. Since the projecting portions are provided, the opening of the outside air passage can be changed to vary a flow velocity, whereby cooling efficiency can be enhanced.

According to another aspect of the invention, the battery cell accommodating case is formed with a suction slit for introducing the outside air into the battery cell accommodating case, and an exhaust slit that exhausts the introduced outside air. The suction slit is formed to have an opening area larger than the exhaust slit, and the suction slit and the exhaust slit are formed on positions opposite to each other in a vehicle width direction. Therefore, the flow velocity of the introduced outside air at the exhaust part is increased to enhance the cooling function. Since the exhaust slit is formed in the position opposite to the suction slit in the vehicle width direction, the adjacent battery modules can be cooled by the outside air exhausted from the exhaust slit when the battery modules are arranged side by side in the vehicle width direction.

BRIEF DESCRIPTION OF THE DRAWINGS

FIG. 4 is an exploded perspective view of a battery unit.

DETAILED DESCRIPTION OF THE PREFERRED EMBODIMENTS

Figure 1:
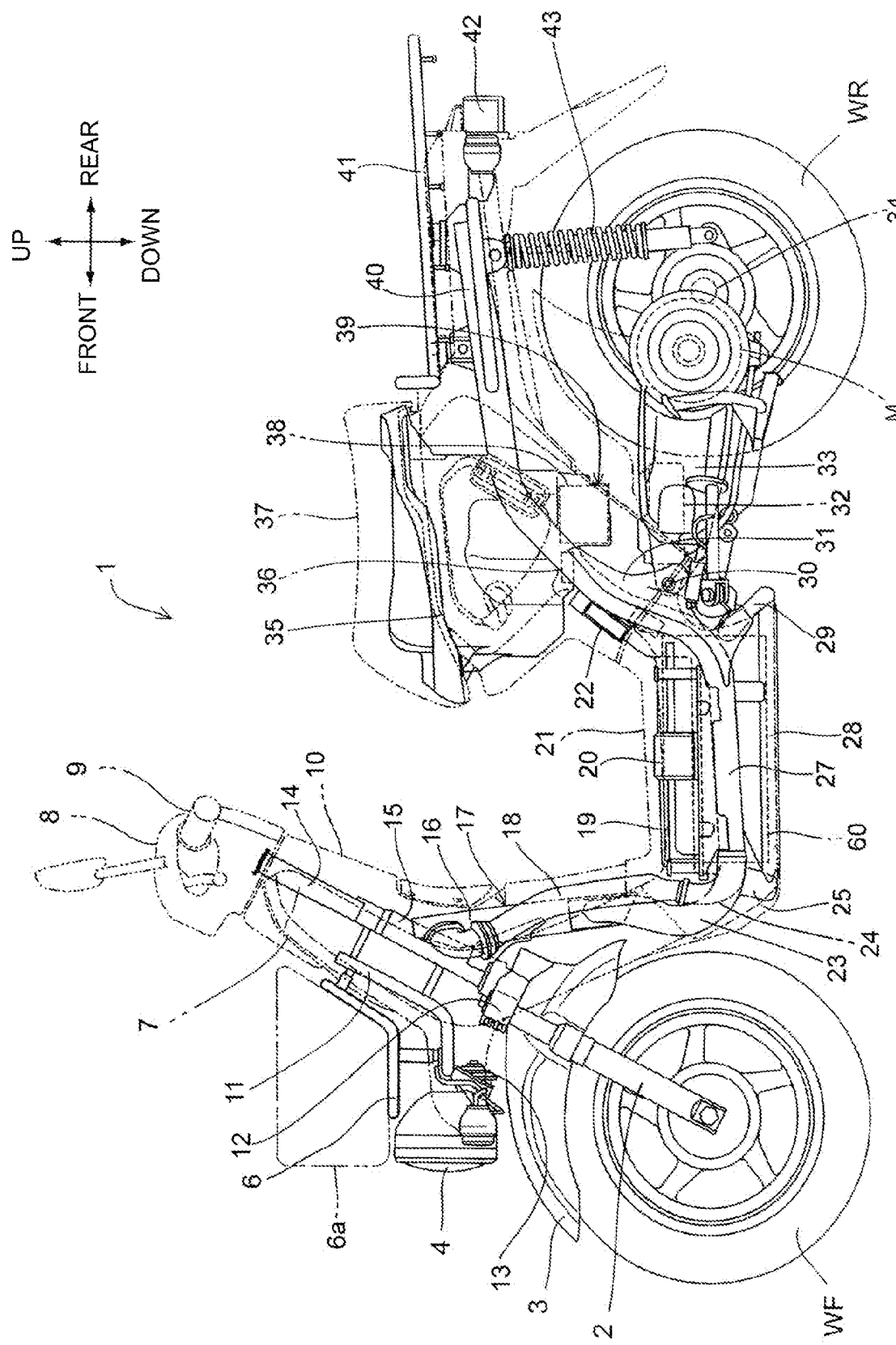
FIG. 1 is a perspective side view of an electric motorcycle.
Figure 2:
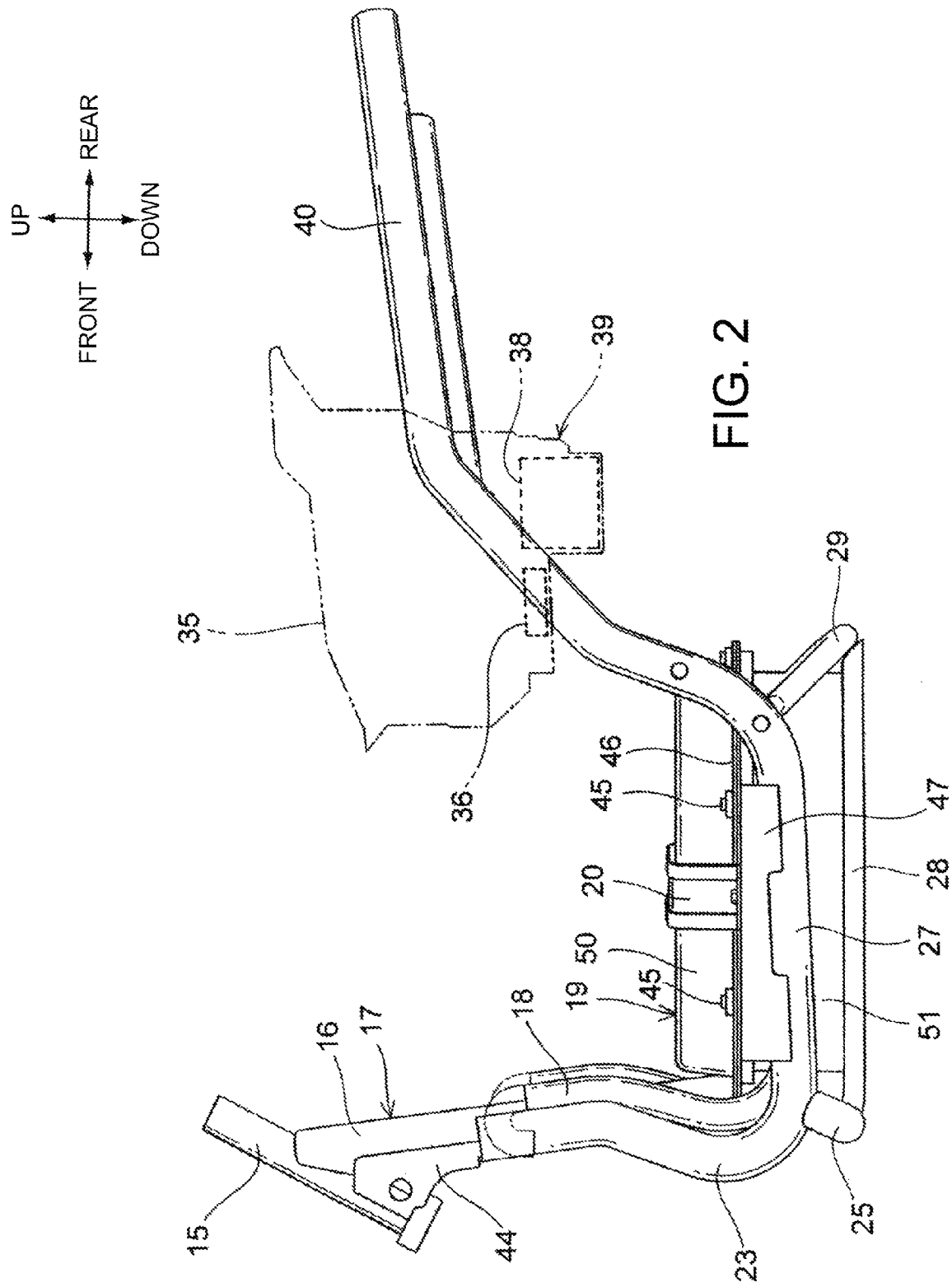
FIG. 2 is a side view of a body frame.
Figure 3:
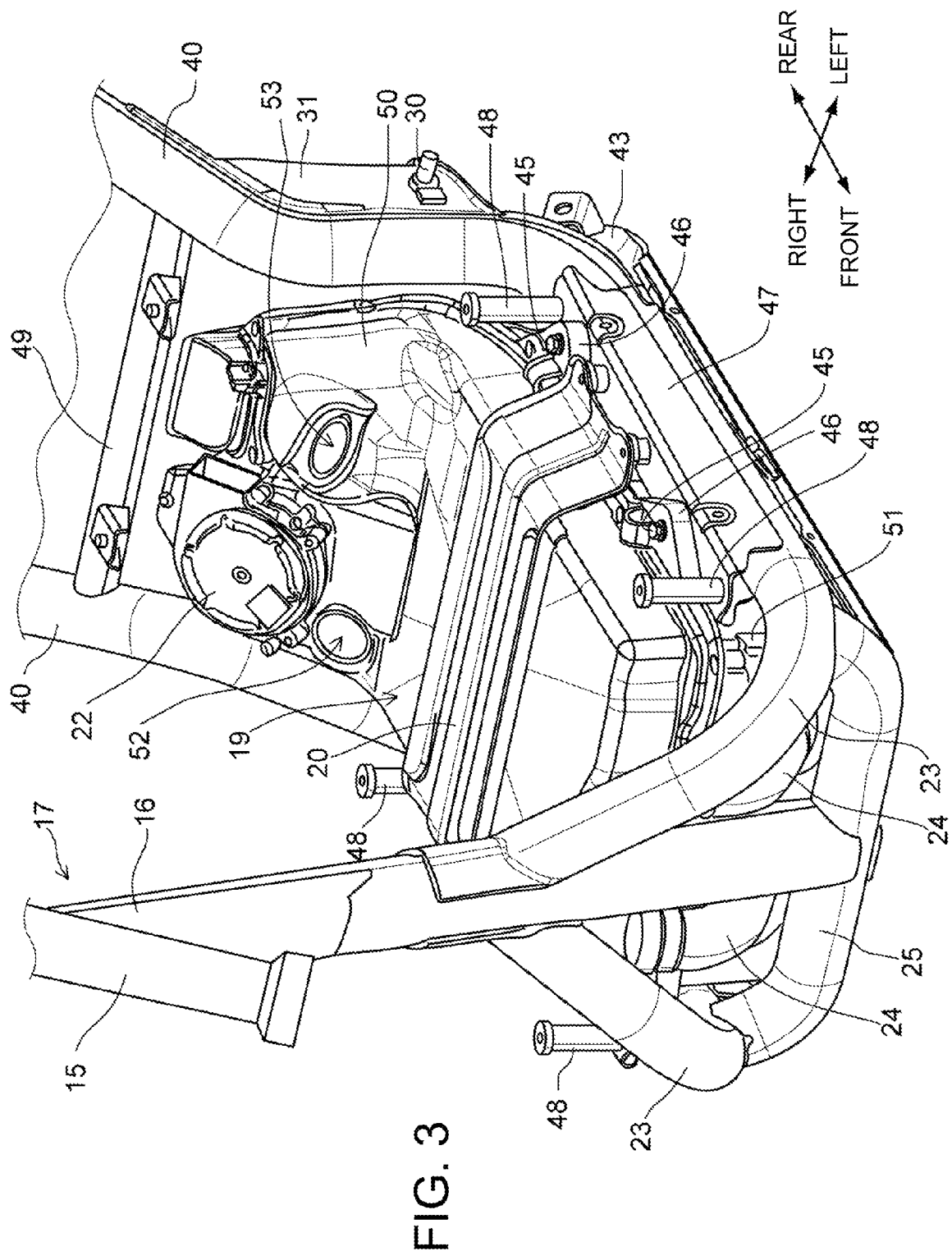
FIG. 3 is a perspective view of the body frame.

Embodiments of the present invention will be described in detail below with reference to the drawings. FIG. 1 is a left side view of an electric motorcycle 1 according to one embodiment of the present invention. FIG. 2 is a left side view of a body frame 17, and FIG. 3 is a perspective view of the body frame 17

The electric motorcycle 1 is a scooter saddle-ride type electric vehicle having a low floor 21, and has a structure in which a rear wheel WR journaled to an axle 34 is rotatively driven by rotation power generated by an electric motor M incorporated into a swing arm 33.

The body frame 17 of the electric motorcycle 1 includes a head pipe 15 that steerably supports a front fork 2, which journals a front wheel WF, and a rodlike steering handlebar 9 coupled to the upper part of the front fork 2, and tilts upward and rearward; a main frame 16 that extends rearward and downward from the head pipe 15; left and right under frames 27 coupled to the lower part of the main frame 16 via a curved portion 23, and extending rearward; and left and right rear frames 40 that are integrally continuous with the rear ends of the under frames 27 to extend upward and rearward.

The head pipe 15 turnably journals a steering stem 14, and the steering handlebar 9 is fixed on the upper end of the steering stem 14. On the other hand, an under bracket 12 supporting the upper end of the front fork 2 is fixed to the lower end of the steering stem 14.

The front part of the swing arm 33 is swingably supported on a pivot plate 31 provided to each of the rear frames 40 of the body frame 17 through a pivot shaft 30. A rear cushion unit 43 is provided between a rear part of the left rear frame 40 and a rear part of the swing arm 33. The swing arm 33 is a cantilever arm that journals the rear wheel WR only by the arm on the left side in a vehicle width direction, and a PDU (Power Drive Unit) 32 that controls output of the electric motor M is provided on the position in front of the cantilever arm and just behind the pivot shaft 30.

The electric motorcycle 1 includes a front cover 7 that covers the head pipe 15 from front, a leg shield 10 that is continuous with the front cover 7 from the rear of the head pipe 15 so as to cover legs of an occupant sitting on a seat 37, and the low floor 21 that is continuous with a lower part of the leg shield 10 in order that the occupant sitting on the seat 37 puts his/her legs thereon, and that covers a battery case 19 from above. The periphery of the battery case 19 and the periphery of the rear frame 40 are covered by a cowling made of resin or the like.

A headlight 4 is supported at a front end of the front cover 7 by a front stay 11 fixed to the head pipe 15, while a taillight 42 is mounted to the rear end of the rear frame 40. A horn 13 is mounted at the rear of the headlight 4, and a front fender 3 supported by the front fork 2 is mounted below the horn.

The center of the steering handlebar 9 in the vehicle width direction is covered by a handlebar cover 8, and a front carrier 6 is supported by the front stay 11 in front of the front cover 7. A basket 6a or the like that can accommodate baggage can be mounted to the front carrier 6. A rear carrier 41 is mounted above the rear frame 40.

The battery case 19 that accommodates a high-voltage (e.g., 69 V) battery unit 60 for supplying power to the electric motor M is provided between left and right under frames 27. A guard plate 20 spanning across the battery case 19 in the vehicle width direction is provided between the left and right under frames 27 in order to prevent the battery case 19 from being affected by a load applied to the low floor 21.

A front protection member 25 that is coupled to the lower end of the main frame 16 for protecting the lower part of the front of the battery case 19 is provided to the front part of both the under frames 27. A rear protection member 29 that protects the lower part of the rear of the battery case 19 is provided to the rear part of both the under frames 27, and plural lower protection members 28 that extend in a longitudinal direction of the body to protect the battery case 19 from below are provided between the front protection member 25 and the rear protection member 29.

A downstream end of left and right cooling air introducing ducts 18 are connected to the front of the battery case 19 via a connection pipe 24. The cooling air introducing ducts 18 extend along the main frame 16 so as to sandwich the main frame 16 from both sides in the leg shield 10. The upper end of the cooling air introducing duct 18 is connected to an air intake port formed in the leg shield 10.

A cooling fan 22 for sucking out air in the battery case 19 is provided on the top surface at the rear part of the battery case 19. According to the operation of the cooling fan 22, air is positively introduced from the cooling air introducing duct 18, so that the battery unit 60 in the battery case 19 is cooled.

A synthetic resin accommodating box 35 arranged below the seat 39 and above the swing arm 33 is located between the left and right rear frames 40 so as to be supported by both the rear frames 40. The accommodating box 35 is covered by an openable and closable seat 37 from above. An accommodation recessed part 39 for accommodating a low-voltage battery (e.g., 12 V) that supplies power to accessories such as the headlight 4 and the taillight 42 is integrally formed at the rear lower part of the accommodating box 35 so as to project downward. A fuse box 36 is provided in front of the low-voltage battery 38.

Referring to FIGS. 2 and 3, the battery case 19 made of hard synthetic resin or the like is configured by a bottomed box-like casing body 51, and the cover member 50 covering an upper opening of the casing body 51. A flange 46 protruding in the vehicle width direction is formed around a joint surface between the casing body 51 and the cover member 50. A side bracket 47 is fixed by welding on the top surfaces of both the under frames 27, and the guard plate 20 and the flange 46 of the battery case 19 are fixed on the side bracket 47. The flange 46 having a shape of avoiding the guard plate 20 is fixed on the top surface of the side bracket 47 by a bolt 45.

Columnar posts 48 for supporting the low floor 21 on four points are mounted on the top surfaces at the front ends and the rear ends of both the side brackets 47. The left and right rear frames 40 are coupled by a connection pipe 49, directing in the vehicle width direction, at the upper and rear part of the battery case 19. The battery case 19 is formed with a rising portion toward the rear of the body along the shape of the rear frame 40, and the cooling fan 22 is mounted on the rising portion. Holes 52 and 53 for drawing a high-voltage harness and a signal harness, which extend to the outside from the battery case 19, are formed near the cooling fan 22.

Figure 5:
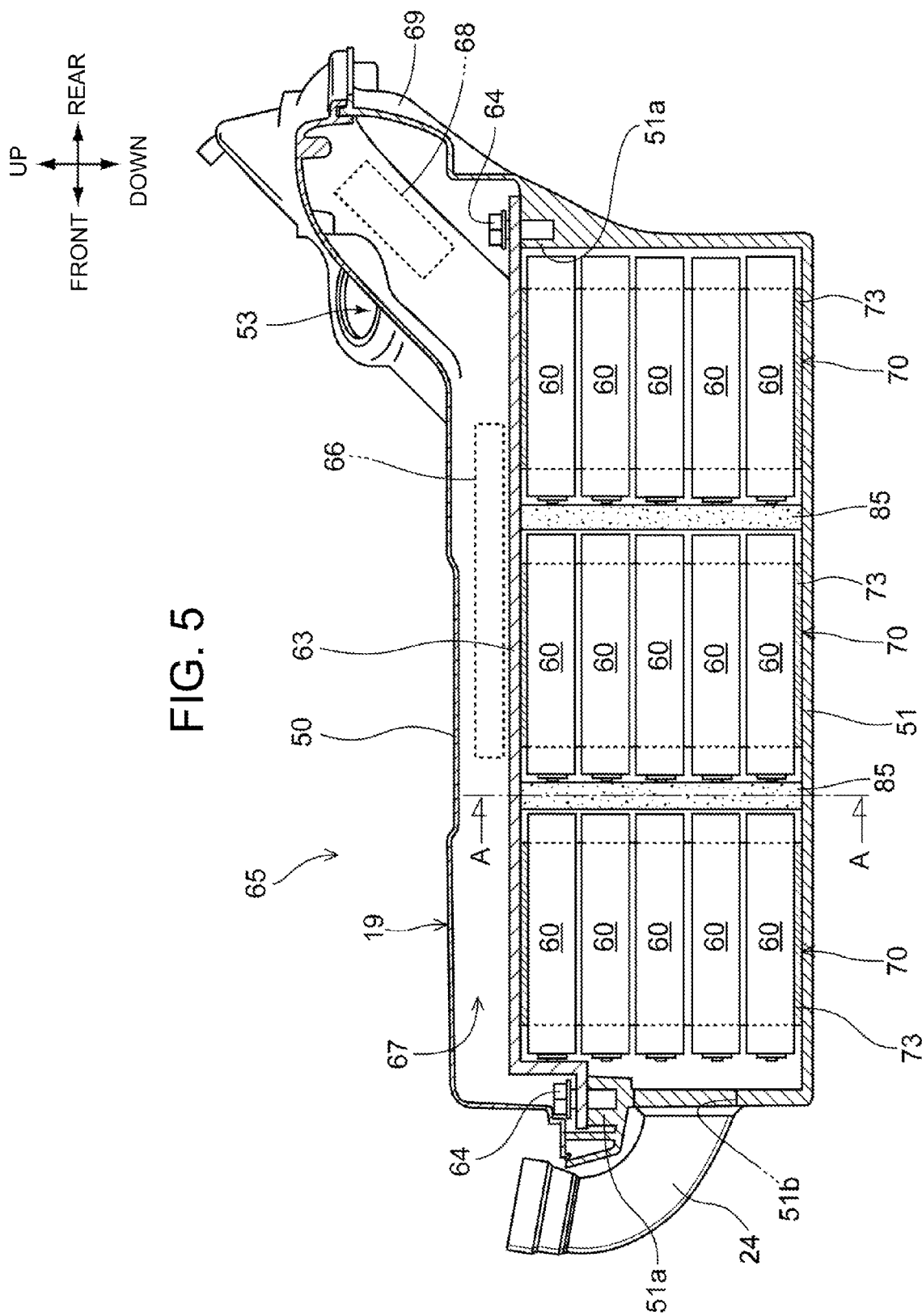
FIG. 5 is a partial sectional side view of the battery unit.
Figure 6:
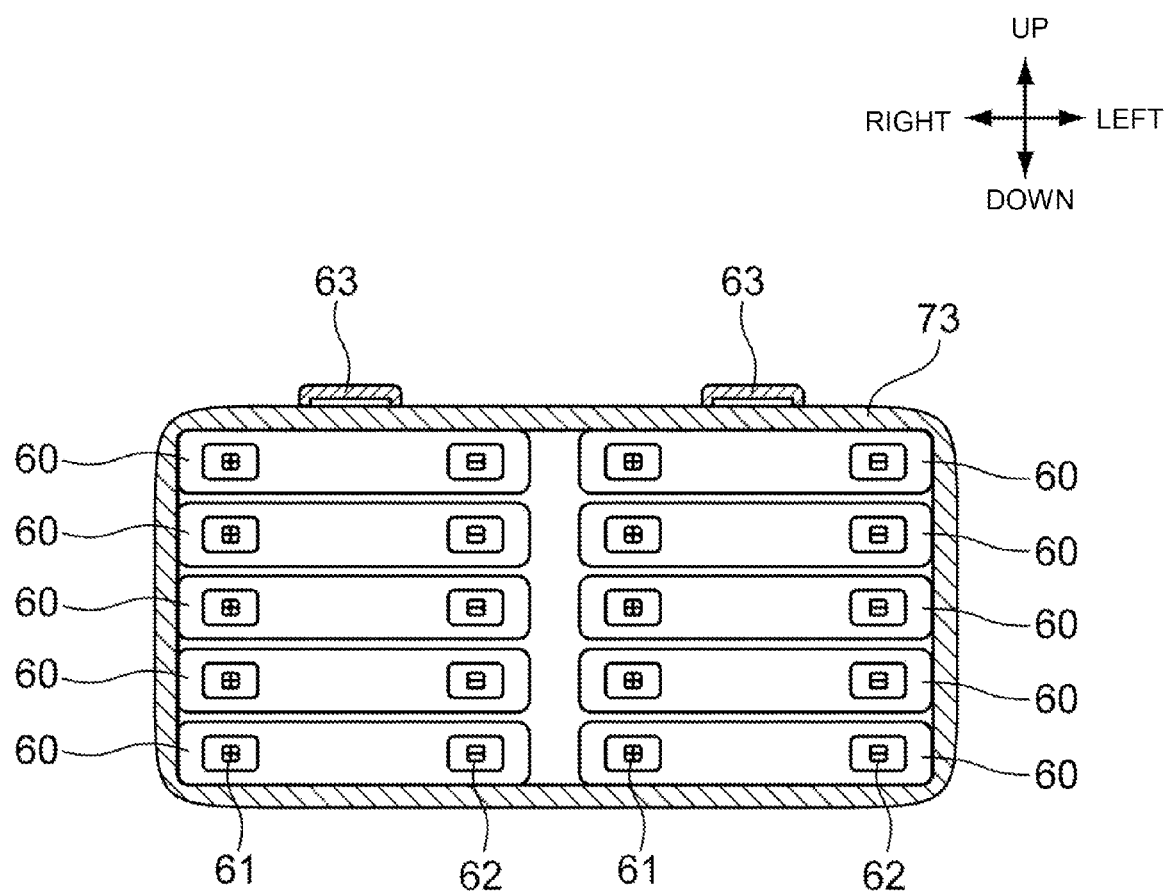
FIG. 6 is a sectional view taken along line A-A in FIG. 5.

FIG. 4 is an exploded perspective view of the battery unit 65. FIG. 5 is a partial sectional side view of the battery unit 65, and FIG. 6 is a sectional view taken along line A-A in FIG. 5. In the present embodiment, the whole battery case 19 accommodating plural battery modules 70 is referred to as the battery unit 65. As described above, through-holes 51b are formed in the casing body 51 of the battery case 19 on the side end face at the front of the body, and the left and right connection pipes 24 are mounted on the through-holes 51b. An expansion portion 69 into which a contactor unit 63 is stored is mounted on the casing body 51 at the rear of the vehicle body.

The battery case 19 accommodates three sets of battery modules 70 in the longitudinal direction of the vehicle body, each set being arranged in a line in the vehicle width direction. The battery module 70 is configured such that ten tabular battery cells 60, each having a sheet-like shape with a certain thickness, are fixed by a band-like fixing member 73. The fixing member 73 is arranged to enclose the outer walls of battery cells 60 of five×two columns. The fixing member 73 can be made of metal or resin, and various shapes can be employed for the fixing member 73.

The battery module 70 is fixed to the casing body 51 by a fixing plate 63 that is a long member directed in the longitudinal direction of the vehicle body. Specifically, the battery module 70 is arranged on a predetermined position of a bottom part of the casing body 51, then the fixing plate 63 is mounted on the battery module 70, and both ends of the fixing plate 63 in the longitudinal direction of the vehicle body are fastened to the casing body 51 with fastening bolts 64 serving as a fastening member, whereby the battery module 70 is fixed to the casing body 51. In the present embodiment, three sets of battery modules 70 arranged in the longitudinal direction of the vehicle body are fixed to the casing body 51 with two fixing plates 63.

The fixing plate 63 is a narrow planar member directed in the longitudinal direction of the vehicle body, and it can be made of metal or hard resin, for example. The fixing plate 63 in the present embodiment is configured such that the side end at the rear of the vehicle body is linearly formed, but the side end at the front of the vehicle body is formed with a step according to a fastening portion 51a arranged on a position slightly lower than the top surface of the battery module 70, as viewed from the side of the vehicle body. An insert nut casted during the molding of the casing body can be applied to the fastening portion 51a to which the fastening bolt 64 is screwed. The cover member 50 and the casing body 51 are connected to each other such that a bolt (not illustrated) penetrating the through-hole 50a, formed in the cover member 50, from above is screwed to the screw hole 51c formed in the casing body 51. As described above, the fastening portion 51a at the end of the fixing plate 63 at the front of the vehicle body is arranged at the position slightly lower than the top surface of the battery module 70, so that it is behind the sidewall of the casing body 51 in FIG. 4.

According to the configuration described above, the battery module 70 can be fixed with pressure being applied from above the battery module 70 by fastening the fastening bolt 64 according to the size between both ends of the fixing plate 63 and the fastening portion 51 when the fixing plate 63 is arranged on the top surface of the battery module 70. Accordingly, this structure can provide both a function of fixing the battery module 70 to the casing body 51 and a function of preventing the expansion of the battery cell 60 caused by the secular change or heat generation to the fixing plate 63. Therefore, the tightening structure of the battery cell can be simplified to reduce the number of components, whereby the battery unit can be made compact.

In the present embodiment, the fastening portion 51a of the fixing plate 63 is formed near the opening of the casing body 51, whereby the space between the battery module 70 and the inner wall of the casing body 51 can be easily decreased, compared to the structure in which the fastening portion of the fixing plate is formed near the bottom of the casing body, and hence, the battery unit can be made compact. Since the length of the fixing plate can be reduced, the possibility of deformation of the fixing plate due to the expansion of the battery can be reduced. Plural fixing plates 63 may be provided.

A planar battery management unit (BMU) 66 with a certain thickness can be arranged in a space 67 formed above the fixing plate 63, for example. A first sponge 85 serving as a first intermediate member for closing the gap between the battery modules 70 is provided between the battery modules 70.

Figure 7:
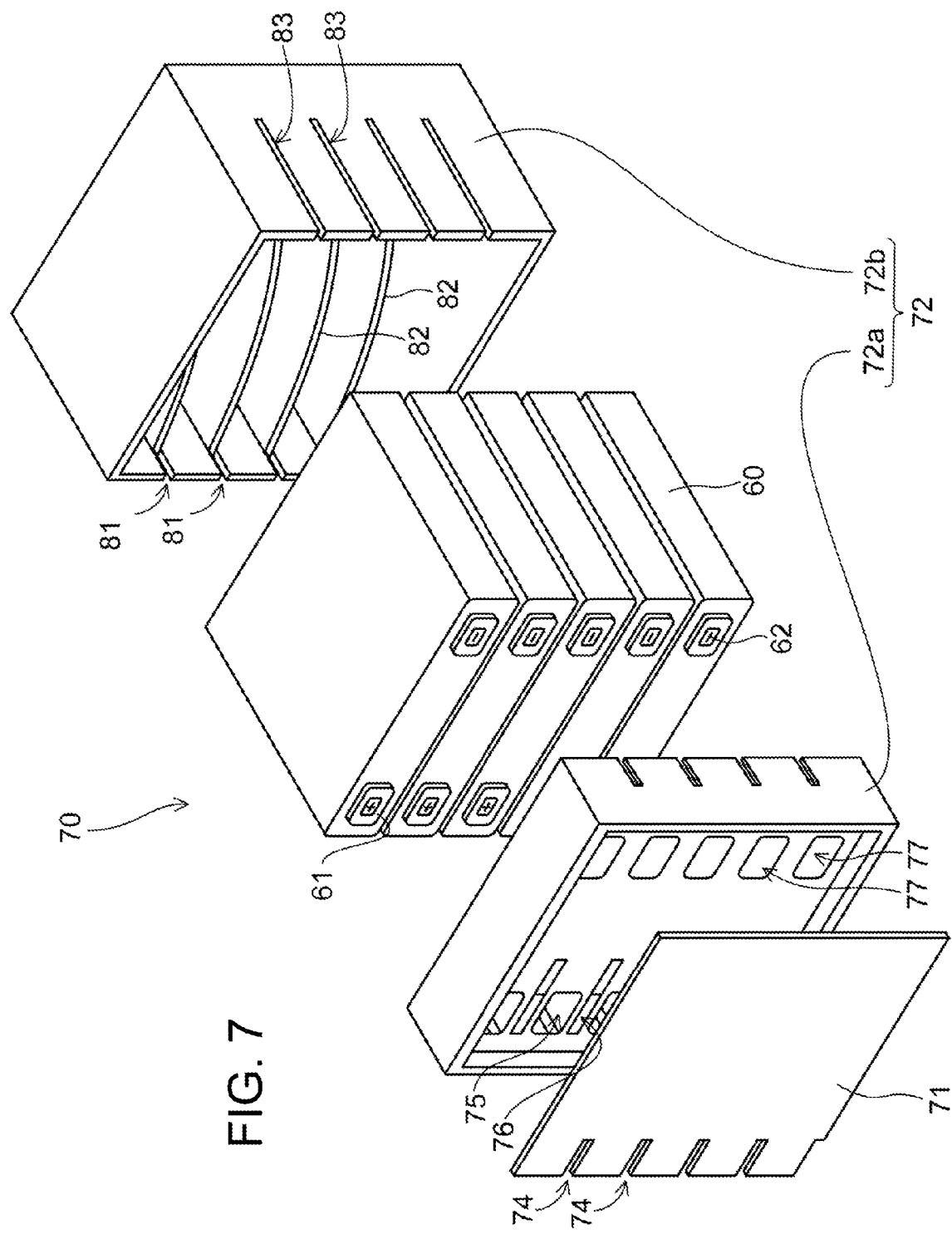
FIG. 7 is an exploded perspective view of a battery module.

FIG. 7 is an exploded perspective view of the battery module 70. FIGS. 4, 5, and 6 illustrate the battery module 70 in which two sets of five stacked battery cells 60 are arranged in parallel and fixed by the band-like fixing members 73. On the other hand, FIG. 7 illustrates a modification using a battery accommodating case 72 that accommodates five battery cells 60. The battery accommodating case 72 can also be inserted from the opening of the casing body 51, and fixed by the fixing plate 63, so that it can be fixed to the casing body 51 with pressure being applied from top of the battery module 70. In the present embodiment, the battery cells 60 are stacked flat, i.e., stacked in the vertical direction of the vehicle body, and since the fixing plate 63 is arranged in the expanding direction of the cells, the expansion of the cells can be prevented with force being equally applied to all cells.

A partition plate rising from the inner wall of the battery accommodating case 72 is inserted between the battery cells 60, by which a gap between the battery cells 60 is regulated. The positive electrode 61 and the negative electrode 62 of the battery cell 60 are provided on the face at the front of the vehicle body so as to be separated from each other.

The battery cell accommodating case 72 includes a front half body 72a and a rear half body 72b, which are made of hard resin or the like. The rear half body 72a and the rear half body 72b are formed such that plural partition plates that are sandwiched between the battery cells 60 are formed in a bottomed box having sidewalls in the vertical and lateral directions, and plural slits through which outside air flows are formed in a part of the sidewall.

The rear half body 72b is formed with four partition plates 82, four suction slits 83, and four exhaust slits 81. On the other hand, the front half body 72a is formed with four partition plates 98 (see FIG. 9), four right exhaust slits 79, and four front exhaust slits 76. The front half body 72a is also formed with a through-hole 75 from which the positive electrode 61 of the battery cell 60 is exposed, and a through-hole 77 from which the negative electrode 61 is exposed.

The front half body 72a and the rear half body 72b are joined to each other by a mounting portion (not illustrated) rising from the sidewall faces of both bodies with five battery cells 60 being accommodated between them. The mounting portion can be formed by an engagement structure such as a claw hook that does not need an independent fastening component. A protection plate 71 for protecting wiring (not illustrated) connected to both electrodes 61 and 62 is mounted on the face of the front half body 72a at the front of the vehicle body. The protection plate 71 is formed with four slits 74 that are aligned with the front exhaust slits 76 on the front half body 72a.

Figure 8:
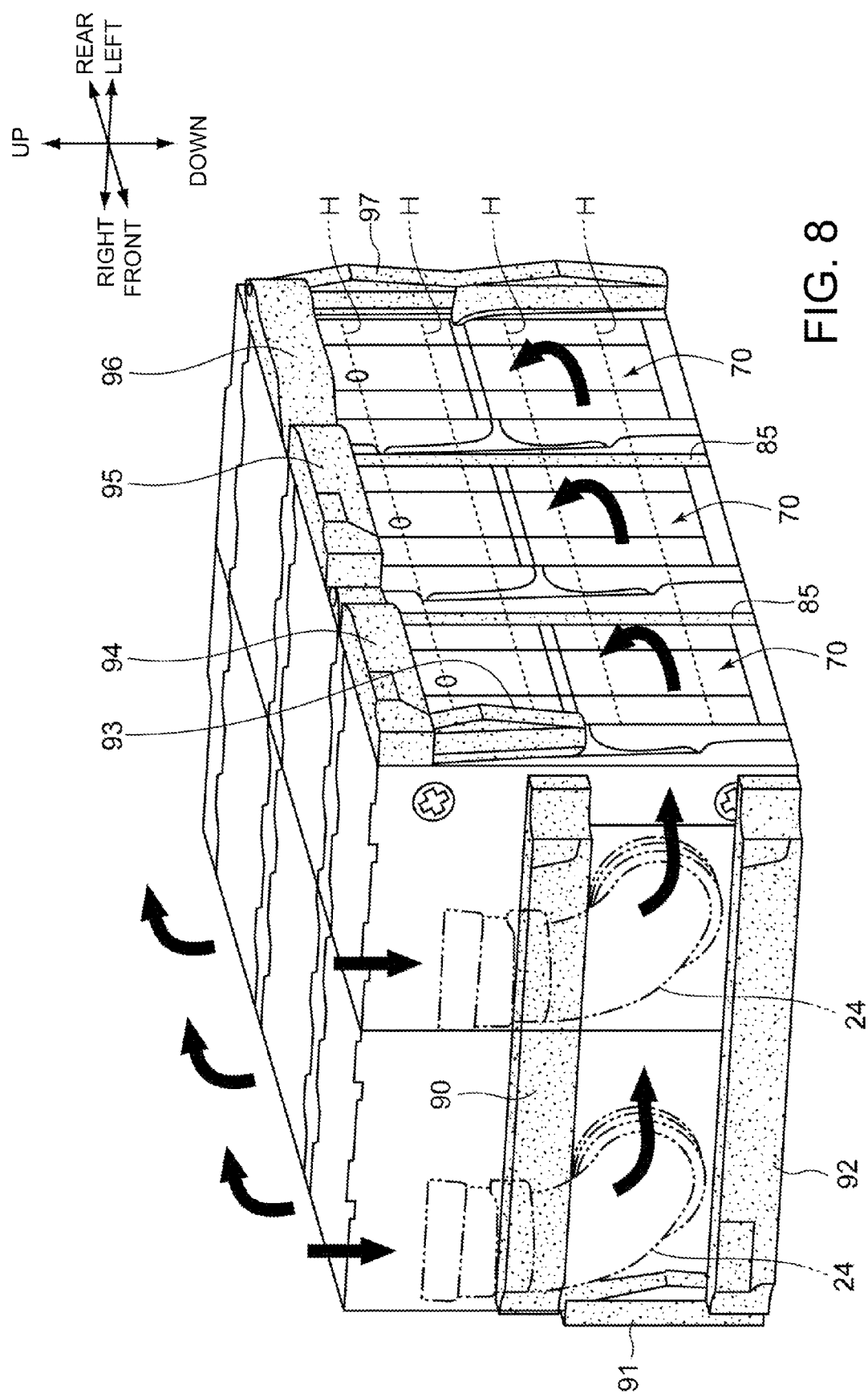
FIG. 8 is a perspective view illustrating a positional relationship between three sets of battery modules.
Figure 9:
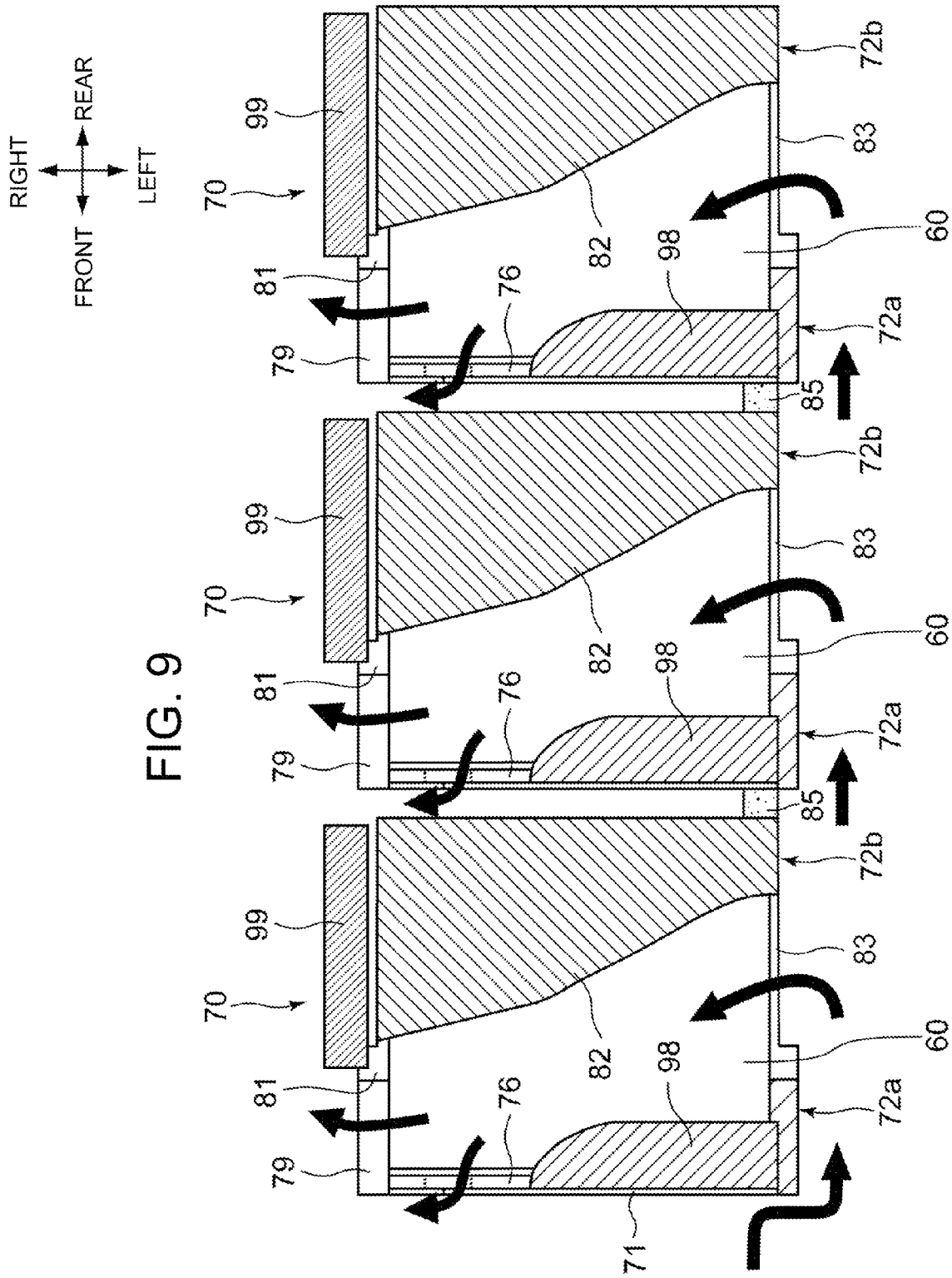
FIG. 9 is a partial sectional top view illustrating a flow of air flowing in the battery module.

FIG. 8 is a perspective view illustrating the positional relationship between three sets of battery modules 70. FIG. 9 is a partial sectional top view illustrating a flow of air flowing through the battery module 70. FIG. 9 illustrates that the three sets of battery modules 70 are arranged in the longitudinal direction of the vehicle body. Outside air introduced into the battery case 19 through the connection pipe 24 is guided to the left of the battery module 70 in the vehicle width direction by second sponges 90, 91, and 92 serving as second intermediate members for filling the gap between the inner wall of the battery case 19 and the battery module 70. This is achieved by the second sponges 90, 91, and 92, which are continuously arranged to form an approximate U shape to restrict an escape route of the outside air.

The outside air guided to the left of the battery module 70 in the vehicle width direction is then guided to the right in the vehicle width direction through the inside of the battery module 70. This is achieved because the escape route of the outside air is restricted by arrangement of the first sponge 85 between the battery modules 70 and arrangement of third sponges 93, 94, 95, 96, and 97 serving as third intermediate members continuously arranged from the top end to the rear end on the left side face of the battery module 70. FIG. 7 illustrates stacked lines H of the battery cells 60 that are stacked flat.

With reference to FIG. 9, the outside air guided to the left of the battery module 70 in the vehicle width direction by the function of the second sponges 91 and 92 is prevented from escaping to the top face or rear face of the battery module 70, but is guided to the inside of the battery module 70 from the suction slits 83 of the rear half body 72b, by the functions of the first sponge 85 and the third sponges 93 to 97. In the embodiment described above, the sponge is used as the first to third intermediate members. However, a resin member, a rubber member, a foaming member, and the like that can block traveling air and that can fill the gap can be used for the intermediate members.

The partition plate 98 formed on the front half body 72a and the partition plate 82 formed on the rear half body 72b respectively cover a part of one side face of the battery cell 60, and with this structure, the gap between the battery cells 60 is regulated on the portion where each partition plate is in contact with the battery cell 60, and an outside air passage can be secured on the portion where the partition plates 82 and 98 do not exist. The outside air flowing between the battery cells 60 is discharged to the right of the battery module 70 in the vehicle width direction through the exhaust slits 81 on the rear half body 72b, the front exhaust slits 76 and the right exhaust slits 79 on the front half body 72a. The outside air exhausted from the front exhaust slits 76 collides against the face at the rear of the vehicle body of the adjacent battery modules 70 in front of the vehicle body, so that the battery module 70 is cooled also from the rear of the vehicle body.

More specifically, the battery cell accommodating case 72 is formed with the suction slits 83 for introducing outside air into the battery cell accommodating case, and the exhaust slits 81 for exhausting the introduced outside air, wherein each of the suction slits 83 is formed to have an opening area larger than that of the exhaust slit 81. With this structure, the flow velocity of the introduced outside air can be increased on the exhaust portion, whereby cooling function can be enhanced. Since the exhaust slit 81 is formed on the position opposite to the suction slit 83 in the vehicle width direction, the adjacent battery modules 70 can be cooled by the outside air exhausted from the exhaust slit 81, when the battery module 70 using the battery accommodating case 72 is arranged in the vehicle width direction.

A voltage/thermal monitoring (VTM) board 99 for collecting information on voltage, temperature and the like of the battery is provided on the right face of the battery module 70 in the vehicle width direction. According to this structure, the space on the right side face of the battery module 70 in the vehicle width direction can effectively be used to mount the voltage/thermal monitoring board 99. When three sets of battery modules 70 are arranged in the longitudinal direction of the vehicle body, each set being arranged in two rows in the vehicle width direction, six voltage/thermal monitoring boards 99 can be arranged along the right face in the vehicle width direction. The battery management unit 66 illustrated in FIG. 5 transmits the information collected by the battery management unit 66 to the PDL 32 (see FIG. 1) through CAN communication or the like.

Figure 10:
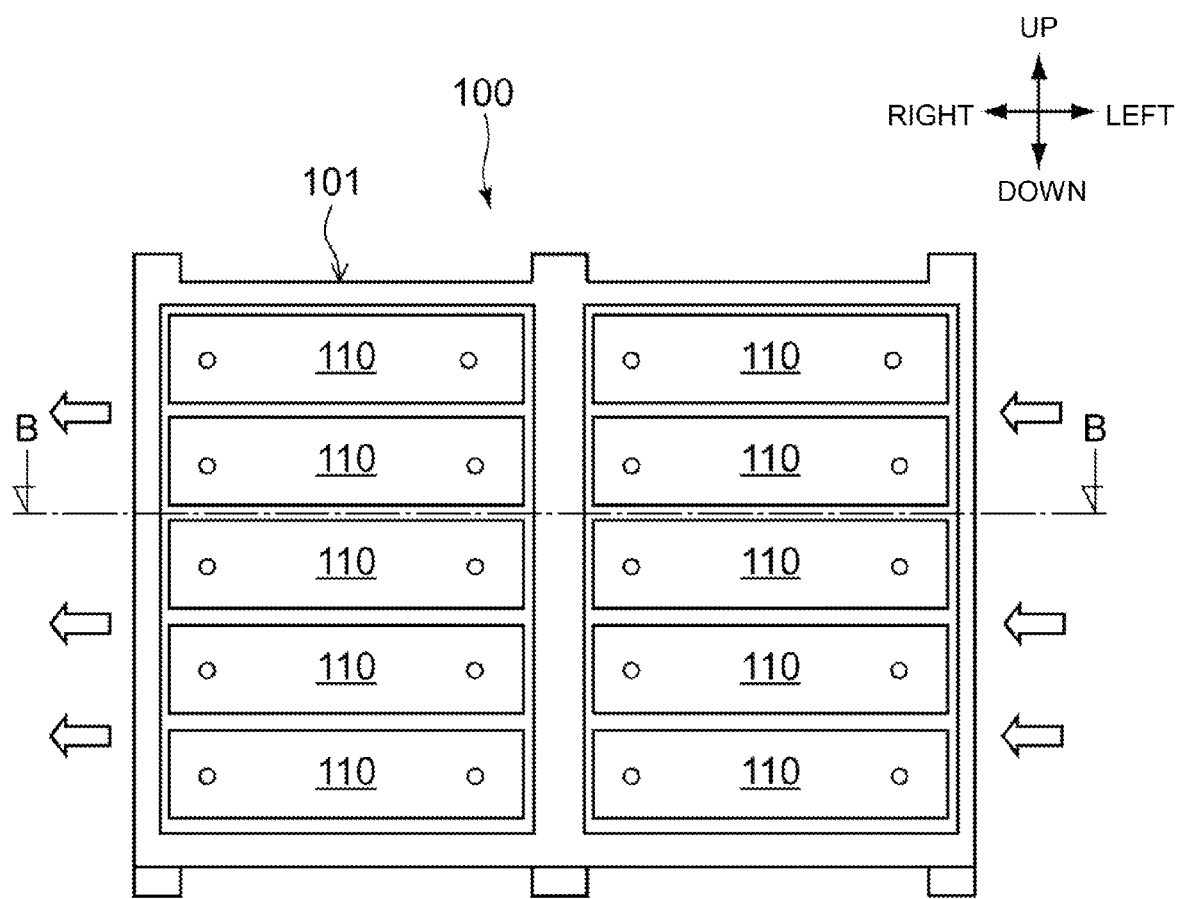
FIG. 10 is a front view of a battery module according to a second embodiment of the present invention.
Figure 11:
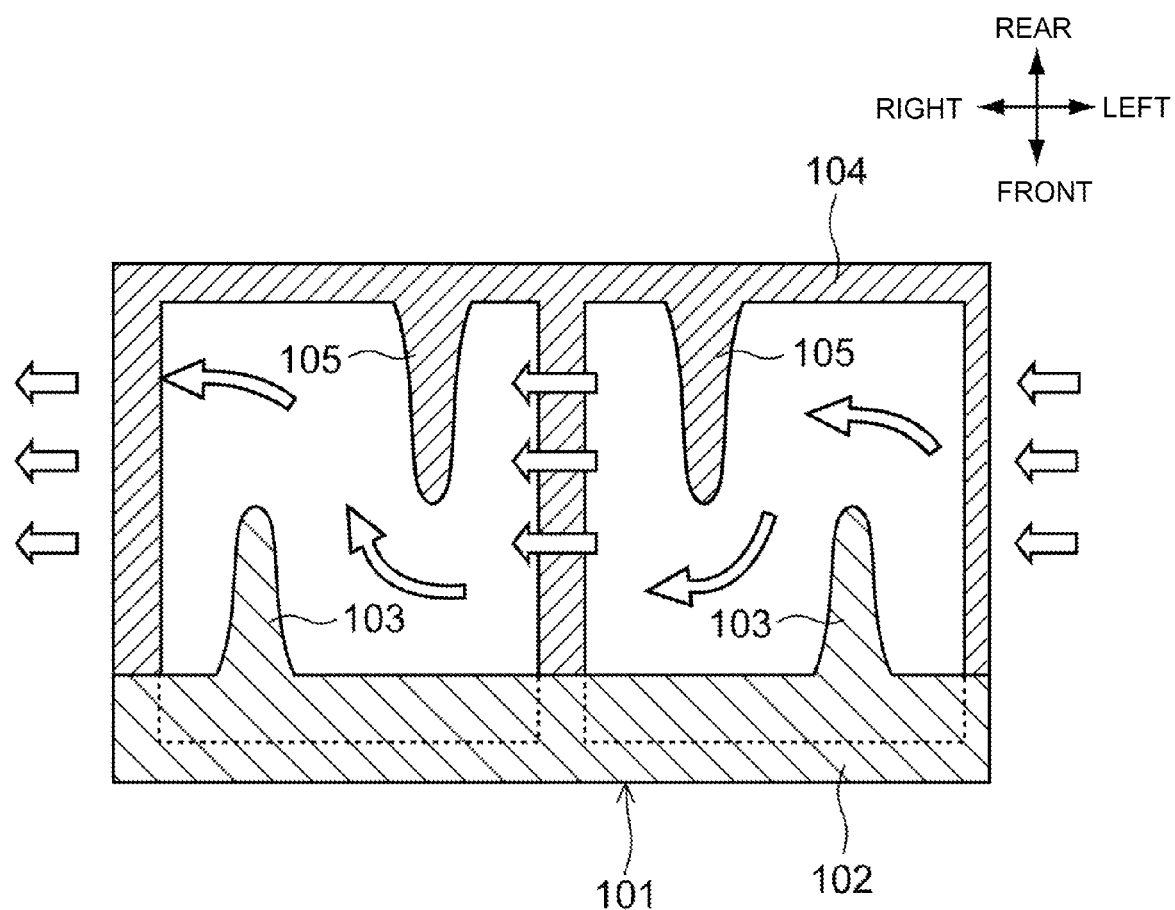
FIG. 11 is a sectional view taken along line B-B in FIG. 10.

FIG. 10 is a front view of a battery module 100 according to a second embodiment of the present invention. FIG. 11 is a sectional view taken along line B-B in FIG. 10. The outside air passage formed between battery cells 110 that are stacked flat can be modified according to the shape of the partition plate formed on a battery cell accommodating case 101. In the present embodiment, the outside air passage extends by a partition plate 103 formed on a front half body 102 of the battery cell accommodating case 101 and a partition plate 105 formed on a rear half body 104 to increase a flow velocity of air, whereby the cooling efficiency can be enhanced. More specifically, the partition plates 105 are projecting portions alternately projecting from the inner wall of the battery cell accommodating case 101 toward the inside. By providing the projecting portions, the opening of the outside air passage can be changed to vary the flow velocity, whereby the cooling efficiency can be enhanced.

The shape and structure of the battery cell and battery module, and the shape and structure of the fixing plate and the fastening member of the battery module are not limited to those described in the above-mentioned embodiments, and various modifications are possible. For example, not only the fastening bolt but also a tapping screw or rivet may be used for the fastening member for fixing the fixing plate to the casing body. The battery unit according to the present invention can be applied not only to the electric motorcycle but also to various electric vehicles such as saddle-ride type three- and four-wheeled vehicles.

REFERENCE SIGNS LIST

1 . . . Electric motorcycle
17 . . . Body frame
19 . . . Battery case
24 . . . Connection pipe
50 . . . Cover member
51 . . . Casing body
51a . . . Fastening portion
51b . . . Through-hole
60 . . . Battery cell 61 . . . Positive electrode
62 . . . Negative electrode
63 . . . Fixing plate
64 . . . Fastening bolt (fastening member)
65 . . . Battery unit
66 . . . Battery management unit
70 . . . Battery module
72 . . . Battery cell accommodating case
72a . . . Front half body
72b . . . Rear half body
82, 98 . . . Partition plate
85 . . . First sponge (first intermediate member)
90, 91, 92 . . . Second sponge (second intermediate member)
93, 94, 95, 96, 97 . . . Third sponge (third intermediate member)
99 . . . Voltage/thermal monitoring board

What is claimed is:

1. A battery unit including a box-like battery case that accommodates therein a battery module having a generally rectangular solid shape and including plural sheet-like battery cells stacked flat in a vertical direction of a vehicle body, the battery case being mounted to the vehicle body, the battery unit comprising:
    a bottomed box-like casing body that forms a part of the battery case and into which the battery module is accommodated from above the vehicle body; and
    a fixing plate that abuts on a top surface of the battery module, wherein: the battery module is configured to be fixed to the casing body with pressure being applied to the battery module from above the vehicle body, by fastening the fixing plate to the casing body;
    plural battery modules are arranged;
    the fixing plate is a member spanning across the plural battery modules; and
    a fastening portion for the fixing plate is provided near an opening of the casing body;
    wherein the battery module comprises a battery cell accommodating case accommodating the battery cells, a partition plate sandwiched between the battery cells is provided on an inner wall of the battery cell accommodating case, and the partition plate is formed to have projecting portions alternately projecting toward an inside of the battery cell accommodating case.

2. The battery unit according to claim 1, wherein a through-hole for introducing an outside air is formed in one wall face of the casing body at the front of the vehicle body,
    wherein the battery unit comprises:
    a first intermediate member that closes a gap between the battery modules; and
    a second intermediate member that closes a gap between an inner wall of the casing body and a side face of the battery module, and
    wherein the second intermediate member is formed to guide the outside air, introduced via the through-hole, toward one of a left side and a right side of the battery module.

3. The battery unit according to claim 2, further comprising:
    a third intermediate member provided on a surface of the battery module at one of the left side and the right side in order to prevent outside air, introduced to one of the left side and right side of the battery module by the second intermediate member, from escaping toward the top surface and a rear surface of the battery module.

4. A battery unit including a box-like battery case that accommodates therein a battery module having a generally rectangular solid shape and including plural sheet-like battery cells stacked flat in a vertical direction of a vehicle body, the battery case being mounted to the vehicle body, the battery unit comprising:
    a bottomed box-like casing body that forms a part of the battery case and into which the battery module is accommodated from above the vehicle body; and
    a fixing plate that abuts on a top surface of the battery module,
    wherein: the battery module is configured to be fixed to the casing body with pressure being applied to the battery module from above the vehicle body, by fastening the fixing plate to the casing body;
    plural battery modules are arranged;
    the fixing plate is a member spanning across the plural battery modules;
    a fastening portion for the fixing plate is provided near an opening of the casing body;
    wherein the battery module comprises a battery cell accommodating case accommodating the battery cells; and
    a partition plate sandwiched between the battery cells is provided on an inner wall of the battery cell accommodating case;
    wherein a through-hole for introducing outside air is formed in one wall face of the casing body at a front of the vehicle body,
    wherein the battery unit comprises:
    a first intermediate member that closes a gap between the battery modules; and
    a second intermediate member that closes a gap between an inner wall of the casing body and a side face of the battery module, and
    wherein the second intermediate member is formed to guide outside air, introduced via the through-hole, toward one of a left side and a right side of the battery module.

5. The battery unit according to claim 4, further comprising:
    a third intermediate member provided on a surface of the battery module at one of the left side and the right side in order to prevent the outside air, introduced to one of the left side and right side of the battery module by the second intermediate member, from escaping toward the top surface and a rear surface of the battery module.

6. A battery unit including a box-like battery case that accommodates therein a battery module having a generally rectangular solid shape and including plural sheet-like battery cells stacked flat in a vertical direction of a vehicle body, the battery case being mounted to the vehicle body, the battery unit comprising:
    a bottomed box-like casing body that forms a part of the battery case and into which the battery module is accommodated from above the vehicle body; and
    a fixing plate that abuts on a top surface of the battery module,
    wherein: the battery module is configured to be fixed to the casing body with pressure being applied to the battery module from above the vehicle body, by fastening the fixing plate to the casing body;
    plural battery modules are arranged;
    the fixing plate is a member spanning across the plural battery modules; and
    a fastening portion for the fixing plate is provided near an opening of the casing body;
    wherein the battery module comprises a battery cell accommodating case accommodating the battery cells, and a partition plate sandwiched between the battery cells is provided on an inner wall of the battery cell accommodating case; and wherein the partition plate has a shape that abuts on at least a part of one surface of each battery cell;

wherein the battery cell accommodating case is formed with a suction slit for introducing outside air into the battery cell accommodating case, and an exhaust slit that exhausts the introduced outside air; the suction slit is formed to have an opening area larger than the exhaust slit; and the suction slit and the exhaust slit are formed on positions opposite to each other in a vehicle width direction.

7. The battery unit according to claim 6, wherein a through-hole for introducing an outside air is formed in one wall face of the casing body at the front of the vehicle body, wherein the battery unit comprises:

a first intermediate member that closes a gap between the battery modules; and a second intermediate member that closes a gap between an inner wall of the casing body and a side face of the battery module, and wherein the second intermediate member is formed to guide the outside air, introduced via the through-hole, toward one of a left side and a right side of the battery module.

8. The battery unit according to claim 7, further comprising:

a third intermediate member provided on a surface of the battery module at one of the left side and the right side in order to prevent the outside air, introduced to one of the left side and the right side of the battery module by the second intermediate member, from escaping toward the top surface and a rear surface of the battery module.

* * * * *